United States Patent
Marchal et al.

(10) Patent No.: US 11,191,290 B2
(45) Date of Patent: Dec. 7, 2021

(54) PROCESS FOR SUPPLYING MAGNESIUM AND/OR CALCIUM ENRICHED WATER BASED BEVERAGE AND ASSOCIATED MANUFACTURING APPARATUS

(71) Applicant: NESTEC S.A., Vevey (CH)

(72) Inventors: Eric Marchal, Vittel (FR); Renaud Sublet, Vittel (FR)

(73) Assignee: Societe des Produits Nestle S.A., Vevey (CH)

( * ) Notice: Subject to any disclaimer, the term of this patent is extended or adjusted under 35 U.S.C. 154(b) by 798 days.

(21) Appl. No.: 15/106,403

(22) PCT Filed: Dec. 16, 2014

(86) PCT No.: PCT/EP2014/078082
§ 371 (c)(1),
(2) Date: Jun. 20, 2016

(87) PCT Pub. No.: WO2015/091566
PCT Pub. Date: Jun. 25, 2015

(65) Prior Publication Data
US 2017/0000164 A1    Jan. 5, 2017

(30) Foreign Application Priority Data
Dec. 18, 2013   (EP) .................................... 13197968

(51) Int. Cl.
*A23L 2/54*    (2006.01)
*A23L 2/38*    (2021.01)
(Continued)

(52) U.S. Cl.
CPC .................. *A23L 2/54* (2013.01); *A23L 2/38* (2013.01); *A23L 2/52* (2013.01); *A23L 33/16* (2016.08);
(Continued)

(58) Field of Classification Search
None
See application file for complete search history.

(56) References Cited

U.S. PATENT DOCUMENTS 5,993,737 A  *  11/1999  Mackintosh ............ C02F 5/083
                                                        210/724
6,261,610 B1 *   7/2001  Sher ...................... A23L 33/165
                                                         426/74
(Continued)

FOREIGN PATENT DOCUMENTS

EP       1460042       9/2004
WO       0198216       12/2001
(Continued)

Primary Examiner — Jenna A Watts
(74) Attorney, Agent, or Firm — K&L Gates LLP

(57) ABSTRACT

The invention relates to a process for producing magnesium and/or calcium-enriched drinking water based beverage, comprising: —preparing a concentrated aqueous solution of magnesium and/or calcium bicarbonate by, a) providing a powder of magnesium and/or calcium compound in a reactor (4); b) adding an aqueous liquid in said reactor; and c) injecting carbon dioxide ($CO_2$) into said reactor; —adding at least part of the concentrated aqueous solution of magnesium and/or calcium bicarbonate into a flowing circuit comprising an aqueous liquid. The invention also relates to the associated manufacturing apparatus comprising a reactor.

16 Claims, 2 Drawing Sheets

(51) Int. Cl.
*A23L 2/52* (2006.01)
*A23L 33/16* (2016.01)
*B01F 3/04* (2006.01)

(52) U.S. Cl.
CPC ...... *B01F 3/04439* (2013.01); *B01F 3/04808* (2013.01); *A23V 2002/00* (2013.01); *B01F 2003/049* (2013.01); *B01F 2003/04943* (2013.01)

(56) References Cited

U.S. PATENT DOCUMENTS

| | | | | |
|---|---|---|---|---|
| 2004/0028792 | A1* | 2/2004 | Jauffret | A23L 2/54 426/590 |
| 2009/0169452 | A1* | 7/2009 | Constantz | B01D 53/1425 423/230 |
| 2012/0201929 | A1* | 8/2012 | Guy | A23L 2/52 426/66 |

FOREIGN PATENT DOCUMENTS

| | | |
|---|---|---|
| WO | 03086973 | 10/2003 |
| WO | 2011045795 | 4/2011 |
| WO | 2011157783 | 12/2011 |

* cited by examiner

PROCESS FOR SUPPLYING MAGNESIUM AND/OR CALCIUM ENRICHED WATER BASED BEVERAGE AND ASSOCIATED MANUFACTURING APPARATUS

CROSS REFERENCE TO RELATED APPLICATIONS

The present application is a National Stage of International Application No. PCT/EP2014/078082, filed on Dec. 16, 2014, which claims priority to European Patent Application No. 13197968.4, filed Dec. 18, 2013, the entire contents of which are being incorporated herein by reference.

FIELD OF THE INVENTION

The present invention relates to a process for supplying magnesium and/or calcium enriched water base beverage, comprising the step of preparing a concentrated mother solution and dissolving a part of said concentrated mother solution in an aqueous liquid.

The present invention also relates to the associated manufacturing apparatus comprising a reactor in which carbon dioxide is injected.

As a further object, the invention also relates to a drinking water based beverage comprising magnesium and/or calcium cations combined with hydrogencarbonate anions and having a limited concentration of ions of the group Na, $SO_4$, K and Cl.

BACKGROUND

Magnesium and calcium belong among four most plentiful metal elements in the body, together with potassium and sodium.

Magnesium is an important element in human biology. Its ions play a major role in manipulating important biological polyphosphate compounds like ATP, DNA, and RNA who are essential to all living cells. Hundreds of enzymes thus require magnesium ions to function. Magnesium ions are sour to the taste, and in low concentrations they help to impart a natural acid taste to fresh mineral waters.

Magnesium is an important element in human biology. It is cofactor of more than 350 enzymes and regulates neuro-excitability and several ion channels. Enzymes involved in ATP production and hydrolysis are magnesium-dependent (Agarwal et al, 2013; Saris et al, 2000). Hypomagnesaemia may result from inadequate intake, renal or gastrointestinal losses or redistribution from extracellular to intracellular space (Hypomagnesaemia, Drug Ther Bull, 2013, 51(3), 33-6).

Low magnesium intakes and blood levels have been associated with chronic diseases (diabetes, hypertension, metabolic syndrome, Bae & Choi, 2011), cardiovascular diseases, osteoporosis, migraine headache, asthma and colon cancer (Rosanoff A et al, 2012). Its deficit in ophthalmic diseases is also documented.

The ratio Ca/Mg should be around 3 and if not, this may be associated with increased risk of mortality: in Chinese women with a ratio lower than 1.7, intake of magnesium was associated with increased risks of mortality due to CVD (Dai et al, 2013).

Animal and human studies have demonstrated that magnesium deficiency results in bone loss probably due to impaired production of parathyroid hormone and 1,25-dihydroxyvitamin D (Rude R K et al, 2005) and could be linked to osteoporosis (Rude R K & Gruber H E, 2004).

There is a growing body of evidence which shows that magnesium could play an important role in reduction of risk to develop type2 diabetes. Rodriguez-Moran M et al (2011) did a review on studies and concluded that epidemiological studies consistently showed a strong inverse relationship between dietary magnesium intake and the risk of developing type 2 diabetes, but, however, observed that results from clinical trials remain scarce and controversial.

The link between magnesium deficiency and cardiovascular diseases (CVD) is now well documented and magnesium supplementation could help to prevent them (Seelig M, 1989; Bo S & Pisu E, 2008). A recent meta-analysis has shown that dietary magnesium is associated with a lower risk of fatal ischemic heart disease but not all cardiovascular diseases and that this inverse association seems to be observed up to 250 mg of magnesium a day (Del Gobbo L C et al, 2013). Another review study (QU X et al, 2013) observed a statistically significant association between magnesium and total cardiovascular diseases events with the largest effect when intake increased from 150 to 400 mg of magnesium a day. Both observed that this inverse correlation between dietary magnesium and CVD was non-linear, contrary to serum magnesium for which inverse correlation is linear.

The effect of magnesium on blood pressure has mostly given inconclusive evidence. Oral magnesium acts as a natural calcium channel blocker, increases nitric oxide, improves endothelial dysfunction and induces direct and indirect vasodilatation (Houston M, 2011). The latest meta-analysis, conducted by Kass L et al (2012), concluded that magnesium supplementation appeared to achieve a small but clinically significant reduction in blood pressure, obtained by combining all trials (by 3-4 mm Hg for systolic blood pressure and 2-3 mm Hg for diastolic blood pressure, which is increased for intakes over 370 mg of magnesium per day). M. Houston (2011) observed that the combination of increased intake of magnesium and potassium coupled with reduced sodium intake is more effective in reducing blood pressure that single mineral intake.

Recent animal studies have shown the role of brain magnesium in preventing cognitive deficits in Alzheimer's disease mouse model. Li et al (2013) have also showed that magnesium-L-threonate exerts synaptoprotective effects in a mouse model of Alzheimer's disease. In parallel, it has been observed an alteration of plasma magnesium in patients with Alzheimer's disease (Barbagallo M et al, 2011; Vural H et al, 2010). This deficit may play a role in the etiopathogenesis of Alzheimer's disease.

In magnesium deficiency, neuronal requirements for magnesium may not be met, causing neuronal damage which could manifest as depression. Magnesium may usually be effective for adjunctive treatment of depression (Eby G A & Eby K L, 2006), even if its role in depression prevention remains unclear (Derom M L et al, 213). According to Eby and Eby, "Fortifying drinking water with biological available magnesium to pre-twentieth century levels is recommended".

Magnesium deficit is linked with several ophthalmic diseases like glaucoma, cataract and diabetic retinopathy. This is due to an imbalance between mediators of vasoconstriction and vasorelaxation and to increased oxidative stress (Agarwal et al, 2013).

Concerning the link between magnesium deficit and skeletal muscular cramps, even if it is often admitted among population, it has never been scientifically documented and studies of oral magnesium supplementation generally describe potential side effects as similar in frequency to placebo. Garrison S R et al (2012) concluded that it is unlikely that magnesium supplementation provides clinically meaningful cramp prophylaxis to muscle cramps.

According to the US NHANES III study (Deng X et al, 2013), magnesium intake alone or its interaction with vitamin D intake may contribute to vitamin D status. The association between serum 25-hydroxy vitamin D and risk of mortality may be modified by the intake level of magnesium. But this needs to be confirmed.

EFSA gave positive opinions on the following health claims:
- Magnesium contributes to normal cell division
- Magnesium contributes to normal psychological functions
- Magnesium contributes to electrolyte balance
- Magnesium contributes to normal energy-yielding metabolism
- Magnesium contributes to the maintenance of normal bone
- Magnesium contributes to normal muscle function including the heart muscle
- Magnesium contributes to the maintenance of normal teeth
- Magnesium contributes to normal nervous system function
- Magnesium contributes to normal protein synthesis
- Magnesium can contribute to a reduction of tiredness and fatigue Concerning calcium, calcium is present at 99% in bones and teeth and food and water supply is key for development and maintenance of bones health from infant to elderly. But calcium supplementation is not without controversy and benefits on skeletal health need to be balanced against potential risks on cardiovascular disease (CVD) as published data suggest a potential detrimental effect of calcium supplementation on CVD (Meier C and Kränzlin M E, 2011). On the other hand, other studies have observed that high calcium intake (>600 mg/d) is inversely associated with some cardiovascular risk factors like blood pressure (Da Silva Ferreira T et al, 2013).

Indeed, more and more attention has been given to its influence on cardiovascular disease. Reid I R and Bolland M J (2008) observed in a large 5 years trial that calcium supplementation appears to accelerate vascular disease, particularly myocardial infarction, in healthy postmenopausal women. A number of prospective epidemiologic studies have examined the relationship between dietary calcium intake and CVD incidence or mortality in middle-aged and older adults and results are contradictory (Wang L et al, 2012). But the possible detrimental effect of higher than recommended calcium intake (hypercalcemia and its complications) should be balanced against the likely benefits of calcium on bone, especially in elderly women (Sabbagh Z and Vatanparast H, 2009.

Combined vitamin D and calcium supplementation can reduce fracture risk, but the effects may be smaller among community-dwelling older adults than among institutionalized elderly persons (Chung M et al, 2011; Lips P et al, 2010). This is confirmed by recent studies of which overall results seems to show that calcium does not significantly reduce fracture risk in postmenopausal women, but for which beneficial effects on fracture risk are seen in women who are adherent to therapy (Spangler M et al, 2011). Another cohort study, the WHI one (Prentice R I et al, 2013), could not make a correlation between calcium plus vitamin D supplementation and myocardial infection or coronary heart diseases, but concluded to their benefit in the risk of hip fracture among postmenopausal women.

For pregnant women, calcium supplementation is associated with a significant protective benefit in the prevention of pre-eclampsia, but no other additional benefits has been observed (Buppasiri P et al, 2011).

EFSA gave positive opinions on the following health claims:
- Calcium is needed for the maintenance of normal bones and teeth
- Calcium contributes to normal blood clotting
- Calcium contributes to normal energy metabolism
- Calcium contributes to normal muscle function and neurotransmission
- Calcium is needed for normal growth and development of bone in children
- Calcium contributes to normal cell division and differentiation Concerning Hydrogenocarbonate, even if they do not belong to essential micronutrients group, hydrogenocarbonate ions (HCO3-) are important in nutrition as they participate to the alkalin-acid equilibrium of the body and as acid load influences the reabsorption of calcium and magnesium in the renal tubuli.

In an investigation on 1413 women and 1125 men, a relation was found between osteoporosis and consumption of cola beverages containing phosphoric acid that lead to an increased acid load with a higher secretion of minerals (Heaney R P and Rafferty K, 2001). Another study demonstrated a close association between the net excretion of acids and the amounts of magnesium and calcium in the urine of elderly people (Rylander et al, 2006). In an interventional study, drinking water containing 403 mg/L carbonate was found to reduce blood pressure in 20 subjects with mild hypertension (Rylander R and Arnaud M J, 2004). Finally, the risk for death in heart infarction was lower with levels of carbonate higher than 110 mg/L and a recommended level could be 250 mg/L (Rylander R et al, 2008).

In several subsequent studies in man, bicarbonate-rich alkali mineral waters with low Potential Renal Acid Load (PRAL) were shown to decrease bone resorption markers and even parathyroid hormone levels (Burckardt P, 2008). Two studies have shown the impact of an alkali load on bone health, especially in healthy postmenopausal women (Burckardt P, 2008). Another one has also shown that diets that differ in their alkali loads but not in the calcium content have different effects on bone resorption markers. In this study, the alkali load was given essentially by 2 daily liters of mineral water with high level of bicarbonate (giving 4868 mg of bicarbonate a day) and PRAL was −124 mEq/d (Buclin et al, 2001). The control diet, with the same level of calcium, protein, salt and energy had no such effect. The conclusion is that some waters containing calcium and bicarbonates, with a strongly negative PRAL, can contribute to the prevention of bone loss.

In 2009, Wynn E and al concluded that the best waters for bone health are rich in both bicarbonate and calcium. Moreover, they observed that, in calcium sufficiency, the acid calcium-rich water had no effect on bone resorption, while the alkaline water rich in bicarbonate led to a significant decrease of bone resorption markers in young women (2009,b). A study conducted by Roux S et al (2004), done on 39 women, showed a beneficial effect of the bicarbonate-rich water on bone metabolism versus a mineral water rich in sulfate.

Recommended Dietary allowances (RDA) correspond to requirement of nearly (98%) all individuals from a group (age and sex) and Adequate Intakes (AI) is the reference intake if sufficient scientific evidence is not available to calculate an RDA. According to the US Institute of Medicine (1997), they are, for Mg and Ca:

|  | Men 30-50 years old | Women 30-50 years old | Nutritional Reference Value (NRV) |
|---|---|---|---|
| Calcium | AI: 1000 mg a day | AI: 1000 mg a day | 800 mg a day |
| Magnesium | RDA: 420 mg a day | RDA: 320 mg a day | 300 mg a day |

Meanwhile, average magnesium intakes in US are 323 mg a day (men) and 228 mg a day (women). For calcium, they are from 871 to 1,266 mg/day for men and from 748 to 968 mg/day for women.

Drinking water should preferably complete the magnesium and/or calcium supplied in food up to the daily required value.

However, tap water frequently contains little magnesium; generally around 5 to 20 mg per liter.

Therefore, the modern principles of preventive medicine and healthy nutrition would require higher intake of magnesium, which can most easily be achieved by drinking mineral water or other bottled water with higher magnesium content. Many of the commercially available bottled waters have very low magnesium contents.

There are few mineral waters containing the above mentioned amounts of minerals and their tastes is generally not appreciated due to high contents in sulfates.

The alternative is then bottled water which is traditionally prepared by way of preparation of demineralized water with all possible kinds of treatments leading to purified water and remineralization of said purified water. The remineralization step consists in adding mineral ions into the demineralized water. Said components are, for example, $MgSO_4$, $MgCl_2$, $CaCl_2$, $NaHCO_3$, $KHCO_3$, NaF or NaCl. The proposed list is not exhaustive and other components can also be used.

By this way, when adding specific mineral ions such as calcium, magnesium or bicarbonates, it is possible to claim health benefits by using some of the health claims above presented for the resulting water.

In relation to the process, a highly concentrated mother solution is generally prepared using the above mentioned salts and the mother solution is diluted with pure water to end with drinking water.

As mentioned above in presenting the possible components for remineralization, when adding calcium ($Ca^{2+}$) or magnesium ($Mg^{2+}$) mineral ions, counter ions such as sulfate ($SO_4^{2-}$) or chloride ($Cl^-$) are simultaneously added. Similarly, the addition of hydrogencarbonate ($HCO_3^-$) is accompanied with sodium ($Na^+$) or potassium ($K^+$) ions. These salts, resulting from the combination of said cations and anions, are usually used because they have a very high solubility in water thus making the enrichment process quite easy in term of process.

However, the added counter anions $SO_4^{2-}$ and/or $Cl^-$ and/or Na and/or K lead to a bitter and/or salty taste in the product affecting the taste of the water so that the resulting drinking water is not appreciated by the consumer.

Other salts comprising magnesium and/or calcium, like $MgCO_3$, $Mg(OH)_2$, $CaCO_3$ are to be considered but they have very little solubility in water making the preparation of mother solution and of enriched water nearly impossible at an industrial scale.

A proposed solution using magnesium oxide (MgO) is presented in the published patent application EP2488269. The proposed solution uses a plug flow reactor filled with MgO seeds in which water ($H_2O$) and carbon dioxide ($CO_2$) are sent. The carbon dioxide reacts with the magnesium oxide and water according to the following chemical reaction:

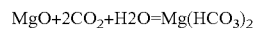

$$MgO+2CO_2+H2O=Mg(HCO_3)_2$$

The resulting component is soluble at low concentration. In order to reach higher concentration, the proposed process comprises a recirculation loop. The necessary high ratio of recycle (up to ten times the flow rate to be treated) results in a costly process in term of energy spent.

It is therefore an object of the present invention to provide a process for supplying magnesium and/or calcium enriched water based beverage, that avoids the drawbacks of the prior art.

In this regards, the invention aims at providing a process capable of supplying commercial volumes of drinking water fortified with magnesium.

It is a further object of this invention to provide an apparatus for manufacturing drinking water with increased magnesium concentration in relation to the proposed process.

It is also an object of this invention to provide drinking water containing at least 55 mg/l magnesium and/or 150 mg/l calcium and having no bitter and/or salty taste.

Other objects and advantages of present invention will appear as the description proceeds.

SUMMARY OF THE INVENTION

In this respect, the invention provides process for producing magnesium and/or calcium-enriched drinking water based beverage according to Claim 1.

Said process allows preparing a concentrated aqueous solution of magnesium and/or calcium bicarbonate and adding at least part of the concentrated aqueous solution of magnesium and/or calcium bicarbonate into a flowing circuit comprising an aqueous liquid.

This is advantageous in that it allows dosing the quantity of concentrated aqueous solution of magnesium and/or calcium bicarbonate to be added to the aqueous liquid in order to have the magnesium and/or calcium-enriched drinking water based beverage with accurate concentration/level of magnesium and/or calcium in the beverage.

It is to be noted that the magnesium compound is selected in the group consisting of magnesium oxide, magnesium hydroxide, magnesium carbonate, magnesium hydroxide carbonate.

Additionally, the calcium compound is selected in the group consisting of calcium oxide, calcium hydroxide, calcium carbonate.

According to a possible feature the process comprise the step of measuring the electrical conductivity of the concentrated aqueous solution in the reactor. This is advantageous in that it allows controlling the level of magnesium and/or calcium compound in the concentrated aqueous solution.

According to one possible feature, during the process, the reactor is kept under partial pressure of carbon dioxide ($CO_2$) of at least 1 atm (atmosphere). The use of carbon dioxide generally increases the dissolution rate of the magnesium/calcium compound during the chemical reaction.

According to a further feature, the pressure of carbon dioxide in the reactor is in the range of 1 atm to 10 atm. A pressure of 10 atm of carbon dioxide in the reactor can increase by 3 times the solubility of the magnesium and/or calcium compound.

According to a supplemental feature, the solubility of magnesium and/or calcium compound is increased by increasing the carbon dioxide ($CO_2$) pressure in the reactor. This is advantageous in that it allows improving the chemical reaction needed in the process.

By way of a proposed feature the reactor is fed with the magnesium and/or calcium compound using a solid dosing pump. This can provide an improved control of the amount of magnesium and/or calcium compound to be fed in the reactor.

In a further feature, the concentrated aqueous solution of magnesium and/or calcium bicarbonate is added in the aqueous liquid to form the magnesium and/or calcium-enriched drinking water based beverage, using a liquid dosing pump. This allows being very accurate in the dosing of the concentrated aqueous solution to be integrated in the aqueous liquid.

In a proposed feature, the reactor is automatically agitated. This is advantageous in that it allows dispersing the gas formed during the reaction thereby improving the chemical reaction.

By way of example, the concentration of magnesium in the concentrated aqueous solution is between 1 g/l and 25 g/l.

In a similar way, the concentration of calcium in the concentrated aqueous solution is between 1 g/l and 75 g/l.

These features allow having a concentration of magnesium in the drinking water based beverage is at least 55 mg/l.

Concerning calcium, the concentration of calcium in the drinking water based beverage is 150 mg/l.

In addition, the flowing circuit comprises an inlet through which a further component is incorporated into said magnesium and/or calcium enriched drinking water based beverage.

For instance, said component is selected from the group consisting of salt, mineral, health-promoting material, and taste or flavor rendering material.

This is advantageous in that is allows to further enriched the drinking water based beverage with components other than magnesium and/or calcium.

According to a further object, the invention provides an apparatus for manufacturing drinking water with increased magnesium concentration according to claim 17.

Said apparatus comprises a tank reactor for the preparation of a concentrated aqueous solution of magnesium and/or calcium bicarbonate aqueous solution of magnesium and/or calcium bicarbonate.

In detail, the apparatus comprises:
i) an open flow circuit with a line of aqueous liquid comprising an outlet for feeding a reactor (4) with aqueous liquid and an inlet for receiving a quantity of concentrated aqueous solution of magnesium and/or calcium bicarbonate from said reactor;
ii) said reactor comprising inlets for receiving magnesium and/or calcium compound, aqueous liquid and carbon dioxide and an outlet provided with dosing means for dosing a quantity of concentrated aqueous solution of magnesium and/or calcium bicarbonate to be fed to the line of the open flow circuit;
iii) injection means for incorporating carbon dioxide ($CO_2$) into said reactor; and
iv) solid dosing means for supplying portions of magnesium and/or calcium compound to said reactor;

The apparatus is a very convenient as there is no management of recycle loop and in that a reactor can also be used at industrial scale.

According to another feature, the apparatus comprises an agitator disposed within the reactor. Thanks to the agitator, it is very easy to create turbulence in the reactor thereby improving the chemical reaction between the ingredients.

According to a further feature, the apparatus comprises:
electrical conductivity measuring means for measuring the electrical conductivity of the concentrated aqueous solution of magnesium and/or calcium bicarbonate in said reactor; and
a regulation unit receiving conductivity data from said electrical conductivity measuring means and managing the feeding of the reactor with magnesium and/or calcium compound to ensure the desired amount of dissolved magnesium and/or calcium in the aqueous liquid of said reactor.

This, therefore, provides an improved control of the reaction and helps in the manufacturing process.

Other objects and advantages of present invention will appear in the following description.

BRIEF DESCRIPTION OF THE DRAWINGS

The invention is further described with reference to the following examples. It will be appreciated that the invention as claimed is not intended to be limited in any way by these examples.

Embodiments of the present invention will now be described, by way of examples, with reference to the accompanying figures in which.

DETAILED DESCRIPTION

As used in this specification, the words "comprises", "comprising", and similar words, are not to be interpreted in an exclusive or exhaustive sense. In other words, they are intended to mean including, but not limited to.

Any reference to prior art documents in this specification is not to be considered as an admission that such prior art is widely known or forms part of the common general knowledge in the field.

At present, both natural mineral and remineralized magnesium-rich waters have a mineralized and bitter taste because of the presence of chloride ions and sulfate ions. It might discourage consumers to buy magnesium-rich waters.

To remove this taste, it is proposed to have insoluble magnesium and/or calcium salts from combinations of oxide/hydroxide/carbonate of magnesium and/or calcium to react with carbon dioxide $CO_2$ in order to get magnesium and/or calcium-enriched drinking water.

As previously mentioned, the invention relates to a process for producing magnesium and/or calcium-enriched drinking water based beverage using the above described apparatus.

Said process proposes to prepare a concentrated aqueous solution of magnesium and/or calcium bicarbonate and to integrate part of said concentrated solution in an aqueous liquid to form magnesium and/or calcium-enriched drinking water based beverage.

For magnesium enrichment, several magnesium compound such as MgO, Mg(OH)$_2$ and MgCO$_3$ were tested in laboratory to study their kinetics, chemical feasibility and stability.

In case of calcium enrichment, we propose to use calcium oxide, calcium hydroxide or calcium carbonate.

Among the proposed compounds the laboratory tests have been carried on with Mg(OH)$_2$ as an example.

Figure 1:
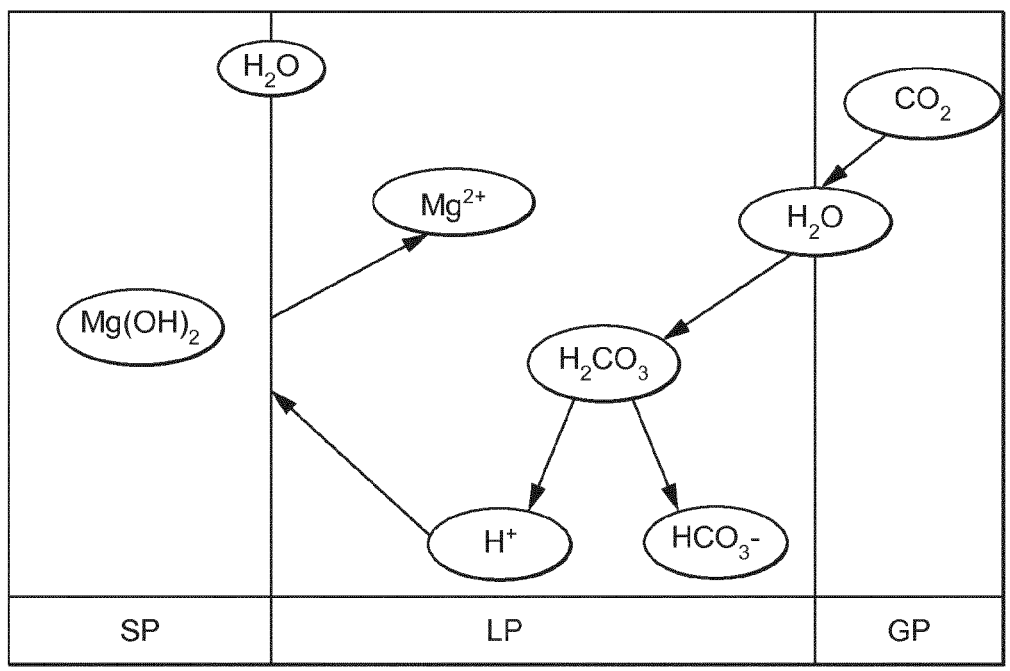
FIG. 1 is a schematic view of the reaction process used for producing magnesium-enriched water according to the invention.

FIG. 1 shows a schematic view of the reaction process used for producing magnesium-enriched water according to the invention.

The main reaction taking place in the proposed process is the following:

$$Mg(OH)_2 + 2CO_2 = Mg(HCO_3)_2$$

With the following decomposition:

Hydration of $CO_2$: $CO_2 + H_2O \rightarrow H_2CO_3$    i

Ionization of $H_2CO_3$: $H_2CO3 \rightarrow H^+ + HCO_3^-$    ii $HCO_3^- \rightarrow H^+ + CO_3^{2-}$ —   iii Reaction between $H^+$ and solid: $2H^+ + Mg(OH)_2 \rightarrow Mg^{2+} + 2H_2O$-   iv As shown in FIG. 1, the carbonation starts with the diffusion of $CO_2$ in water, then $CO_2$ reacts with water to give carbonic acid; carbonic acid is ionized to give $H^+$ and $HCO_3^-$; then $H^+$ is diffused to the surface of solids which allows the carbonation reaction taking place to give magnesium ions.

Thus there is a diffusion of $CO_2$ from gas phase GP to liquid phase LP, chemical reaction and then diffusion of $H^+$ from liquid phase LP to the surface of the compound in the solid phase SP.

In order to avoid forming sediments, $CO_2$ is always in excess in the reaction and the reaction numbered iii can therefore be neglected.

As can be seen from the above formulas, as the concentration of the concentrated mother solution at the end of the reaction depends only on how many materials were added, it is then easier to control the concentration of the concentrated mother solution.

Figure 2:
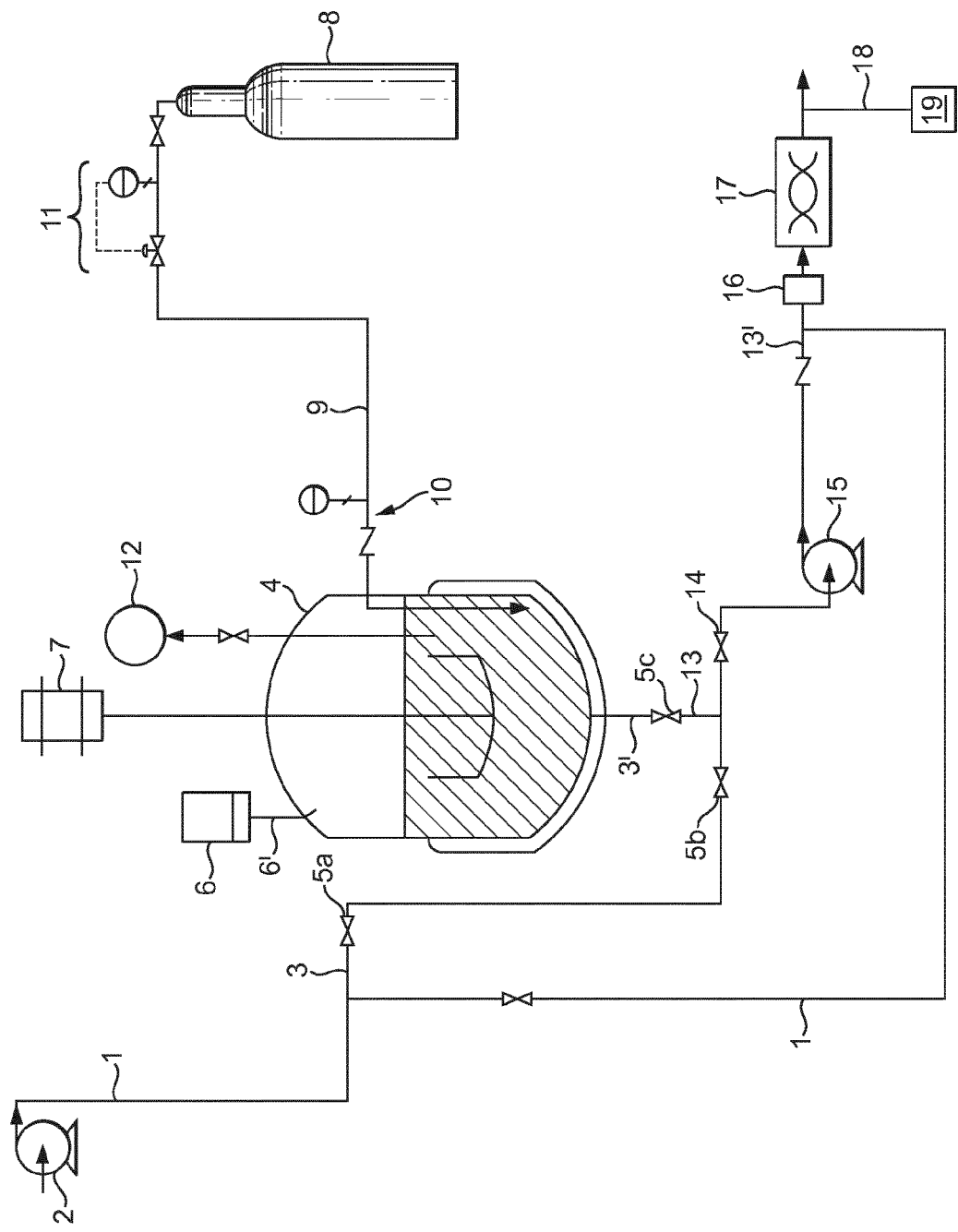
FIG. 2 is a schematic view of the equipment for producing magnesium-enriched water according to the invention.

FIG. 2 schematically represents an apparatus 1 in which is implemented a process for producing magnesium and/or calcium-enriched drinking water based beverage.

Said apparatus comprises an open flow circuit comprising a line 1 of demineralized water comprising a pump 2. Line 1 has an outlet line 3 for feeding a closed reactor 4 in the form of a tank reactor with demineralized water through several valves 5a, 5b, and 5c.

The reactor 4 is fed with demineralized water through inlet line 3'. Outlet line 3 of line 1 corresponds to the inlet line 3' of reactor 4 but they are presented separately according to the component they are related to.

The reactor 4 is initially fed with pure magnesium hydroxide Mg(OH)$_2$ powder and can be further fed with said magnesium compound by a solid dosing pump forming solid dosing means 6.

The reactor 4 is stirred with an agitator 7 to homogenize the mixture and activate and improve the reaction between the ingredients.

Another object of the agitation is to disperse the gas formed during the reaction. Among various types of agitators, the Rushton turbine, known to the skilled person, is a great choice for dispersing the gas. The pilot tests showed that gas dispersion has a great impact on the reaction rate and that agitating the solution contributes to improve the reaction. The speed agitation should be adapted according to the size of the reactor.

The apparatus also comprises a source 8 of carbon dioxide. Gaseous carbon dioxide is injected into the reactor 4 using feeding line 9 using carbon dioxide injection means 10. The level of carbon dioxide to be fed into the reactor is controlled using control means 11. A recycling carbon dioxide system can further be added.

The apparatus further comprises electrical conductivity measuring means 12 for continuously measuring the electrical conductivity of the solution into reactor 4. Said electrical conductivity measuring means 12 allows measuring the level of magnesium dissolved in the aqueous solution.

If necessary, the electrical conductivity measuring means 12 can be calibrated according to the temperature of the reaction in the reactor so that the effect of the temperature can be "neutralized".

A regulation unit (not represented) is used to control and manage the feeding of the reactor with the magnesium compound in order to have to required amount of dissolved magnesium in the aqueous solution in the reactor.

The reactor 4 has an outlet line 13 common with outlet line 3 of line 1 and inlet line 3' of reactor 4 and uses of valves 5a, 5b and 5c when needed.

The outlet line 13 of reactor 4 comprises valve 14 and pump 15.

A least part of the concentrated aqueous solution of magnesium compound is mixed with the demineralized water of line 1. Line 1 comprises an inlet 13' coming from reactor 4 for the concentrated aqueous solution to be injected in line 1 of the open flow circuit.

Dosing means 16 allows integrating the required quantity of concentrated aqueous solution of magnesium compound in line 1 in order to get a water based beverage with the required magnesium level. Said dosing means 16 can be in the form of electrical conductivity measuring means.

To help mixing the concentrated aqueous solution with the demineralized water, a static mixer 17 is incorporated in the apparatus thereby delivering a magnesium-enriched drinking water based beverage.

The proposed apparatus, line 1 of the open flow circuit further comprises an inlet 18 through which another component 19 is incorporated into the magnesium-enriched drinking water based beverage.

The component 19 is selected from the group consisting of salt, mineral, health-promoting material, and taste or flavor rendering material and is therefore selected according to the need.

The invention also related to a process for producing magnesium and/or calcium-enriched water based beverage in which a concentrated aqueous solution of magnesium and/or calcium bicarbonate made in a stirred reactor 4 is added to aqueous liquid, preferably demineralized water.

The concentrated solution is prepared using a powder of magnesium and/or calcium compound in which aqueous liquid, preferably demineralized water is added under a carbon dioxide atmosphere. The powder contains particles having particle size less than 100 μm. The ingredients in the reactor 4 are agitated and are kept under carbon dioxide atmosphere.

The electrical conductivity of the concentrated aqueous solution is measured, continuously or at regular intervals, using electrical conductivity measuring means 12, and reflects the quantity of magnesium and/or calcium compound dissolved in the concentrated solution.

If needed, the concentrated solution can be further concentrated by adding more of magnesium and/or calcium compound. The reactor 4 is then fed with added magnesium and/or calcium compound using a solid dosing pump 6.

A mentioned, the reactor is kept under carbon dioxide atmosphere, the presence of carbon dioxide at pressures greater than atmospheric pressure gives higher magnesium dissolution rates. Indeed, the solubility of $Mg(OH)_2$ can be improved by increasing the pressure of $CO_2$, because higher the pressure is, higher the solubility of $CO_2$ is. It has been estimated that the solubility of $Mg(OH)_2$ can be improved 3 times between a pressure of carbon dioxide of 1 atm and a pressure of carbon dioxide of 10 atm.

Furthermore, in order to avoid waste in carbon dioxide, it is proposed to have the carbon dioxide recycled.

The solution in the reactor is agitated using the agitator 7 to disperse the gas formed during the reaction. Among various types of agitators, the Rushton turbine, known to the skilled person, is a great choice for dispersing the gas. The pilot tests showed that gas dispersion has a great impact on the reaction rate and that agitating the solution contributes to improve the reaction. The speed agitation should be adapted according to the size of the reactor.

Example using $Mg(OH)_2$:

$Mg(OH)_2$ solubility is around 9 mg/L according to the safety data sheet from the supplier.

By making $Mg(OH)_2$ powder react with $CO_2$ and water in a stirred tank reactor, at the end of the reaction a concentrated solution of 5 g/L of $Mg^{2+}$ (12 g/L of $Mg(OH)_2$) which is then in the form of $Mg(HCO_3)_2$ is obtained. Thermodynamically, this concentrated solution is not stable and this salt should precipitate as $MgCO_3$. However, under $CO_2$ atmosphere and room temperature (about 25° C.), it is stable at least 3 days which allows us to produce our products before the crystals appear. Therefore, it is important to keep the reactor closed under $CO_2$ atmosphere. The concentrated solution is next precisely diluted into pure (demineralized) water with a dosing pump. The diluted solution is the final product.

Hence, in a production at industrial scale, the concentrated solution of magnesium and/or calcium compound should be kept under carbon dioxide atmosphere. A mentioned, the concentrated solution prepared in the laboratory is stable under room temperature and $CO_2$ atmosphere for at least several days.

The new process can also be applied to prepare high concentration solution of $Ca(HCO_3)_2$ from $CaCO_3$.

With the proposed process and apparatus, the concentration of magnesium in the concentrated aqueous solution is between 1 g/l and 25 g/l. Similarly, the concentration of calcium in the concentrated aqueous solution is between 1 g/l and 75 g/l.

These concentrated solutions easily lead to drinking water based beverage having a concentration of magnesium of at least 55 mg/l and a concentration of calcium of at least 150 mg/l.

The obtained concentrations allows to reach concentrations similar to magnesium and calcium concentration of highly mineralized natural spring waters without the specific taste of these highly mineralized natural spring waters which is a great success.

Although the invention has been exemplified for magnesium enriched drinking water based beverage, the invention can be implemented for calcium enriched drinking water based beverage and for magnesium and calcium enriched drinking water based beverage without departing from the invention.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A process for producing a calcium-enriched drinking water based beverage, the process comprising:
    preparing a concentrated aqueous solution of calcium bicarbonate using an apparatus comprising a closed reactor, a line of an open flow circuit comprising a first outlet line, a first inlet line feeding into the closed reactor, and a second outlet line feeding from the closed reactor through a second inlet line into the line of the open flow circuit, wherein the first outlet line, the first inlet line, and the second outlet line are connected to each other at a three-way junction, the preparing of the concentrated aqueous solution comprises:
        providing a powder of a calcium compound in the closed reactor, wherein the calcium compound is selected from the group consisting of calcium oxide, calcium hydroxide, calcium carbonate, and mixtures thereof;
        adding an aqueous liquid from the first outlet line through the first inlet line into the closed reactor; and
        injecting carbon dioxide into the closed reactor to form the concentrated aqueous solution of calcium bicarbonate, into the open flow circuit comprising the aqueous liquid; and
    adding at least part of the concentrated aqueous solution of calcium bicarbonate from the closed reactor through the second outlet line, to the second inlet line, and into the line of the open flow circuit, wherein the first inlet line feeding into the closed reactor is common with the second outlet line feeding from the closed reactor.

2. The process according to claim 1 wherein the powder further comprises a magnesium compound selected from the group consisting of magnesium oxide, magnesium hydroxide, magnesium carbonate, and magnesium hydroxide carbonate.

3. The process according to claim 1, comprising measuring the electrical conductivity of the concentrated aqueous solution in the closed reactor.

4. The process according to claim 1, wherein the pressure of carbon dioxide atmosphere in the closed reactor is maintained in the range of 1 atm to 10 atm.

5. The process according to claim 1, wherein the solubility of the calcium compound is increased by increasing the pressure of the carbon dioxide atmosphere in the closed reactor.

6. The process according to claim 1, wherein the closed reactor is fed with the calcium compound using a solid dosing pump.

7. The process according to claim 1, wherein the concentrated aqueous solution of calcium bicarbonate is added into the open flow circuit comprising the aqueous liquid to form the calcium-enriched drinking water based beverage using a liquid dosing pump.

8. The process according to claim 1 wherein the closed reactor is automatically agitated.

9. The process according to claim 2 wherein the concentration of magnesium in the concentrated aqueous solution is between 1 g/l and 25 g/l.

10. The process according to claim 1 wherein the concentration of calcium in the concentrated aqueous solution is between 1 g/l and 75 g/l.

11. The process according to claim 2 wherein the concentration of magnesium in the drinking water based beverage is at least 55 mg/l.

12. The process according to claim 1 wherein the concentration of calcium in the drinking water based beverage is 150 mg/l.

13. The process according to claim 7, wherein a further component is incorporated into the calcium enriched drinking water based beverage through the second inlet line, and the second inlet line is downstream of the liquid dosing pump which adds the concentrated aqueous solution of calcium bicarbonate in the aqueous liquid.

14. The process according to claim 13, wherein the further component is selected from the group consisting of salt, mineral, health-promoting material, and taste or flavor rendering material.

15. The process according to claim 1 further comprising mixing the concentrated aqueous solution of calcium bicarbonate with an agitator within the closed reactor, and
mixing the concentrated aqueous solution with water in a static mixer.

16. The process according to claim 1 further comprising keeping the concentrated aqueous solution of calcium bicarbonate under a pressure of a carbon dioxide atmosphere of at least 1 atm to 10 atm in the closed reactor during the process.

* * * * *